United States Patent
Bertocchi

(10) Patent No.: US 7,252,036 B2
(45) Date of Patent: Aug. 7, 2007

(54) ROTOR BLADES FOR FOOD PROCESSING MACHINES

(76) Inventor: Primo Bertocchi, Via Argonne, 8 43100, Parma (IT)

(*) Notice: Subject to any disclaimer, the term of this patent is extended or adjusted under 35 U.S.C. 154(b) by 536 days.

(21) Appl. No.: 10/362,374

(22) PCT Filed: Jul. 25, 2001

(86) PCT No.: PCT/IT01/00410

§ 371 (c)(1),
(2), (4) Date: Feb. 28, 2003

(87) PCT Pub. No.: WO02/19845

PCT Pub. Date: Mar. 14, 2002

(65) Prior Publication Data

US 2003/0188640 A1  Oct. 9, 2003

(30) Foreign Application Priority Data

Sep. 7, 2000  (IT) .................. PR2000A0049

(51) Int. Cl.
A47J 19/00 (2006.01)

(52) U.S. Cl. .............. 99/537; 241/70; 241/73; 241/74; 241/188.1; 241/189.1; 241/191

(58) Field of Classification Search ......... 426/518, 426/519; 99/537; 366/194–196, 244–245, 366/343; 241/68–70, 73–74, 188.1, 189.1, 241/191

See application file for complete search history.

(56) References Cited

U.S. PATENT DOCUMENTS

| | | | | |
|---|---|---|---|---|
| 3,659,638 A | * | 5/1972 | Paoli ........................ | 241/74 |
| 4,312,596 A | * | 1/1982 | Maezawa et al. ........... | 366/343 |
| 4,643,085 A | * | 2/1987 | Bertocchi .................... | 99/510 |
| 4,718,610 A | * | 1/1988 | Gallaher .................... | 241/37.5 |
| 4,852,814 A | * | 8/1989 | Amiot et al. ............... | 241/37.5 |
| 5,283,078 A | * | 2/1994 | Bertocchi .................... | 426/665 |
| 5,358,189 A | * | 10/1994 | Vandermolen ............... | 241/92 |
| 5,405,094 A | * | 4/1995 | Poser et al. .................. | 241/74 |
| 5,505,390 A | * | 4/1996 | Rodgers ...................... | 241/48 |
| 5,544,821 A | * | 8/1996 | Gupta et al. ........... | 241/46.017 |
| 5,765,767 A | * | 6/1998 | Iwata et al. .................. | 241/74 |
| 6,223,652 B1 | * | 5/2001 | Calia et al. .................. | 99/513 |
| 6,340,125 B1 | * | 1/2002 | Murata et al. ............... | 241/47 |
| 6,499,873 B1 | * | 12/2002 | Chen .......................... | 366/197 |
| 6,604,455 B2 | * | 8/2003 | Areh et al. .................. | 99/510 |
| 6,655,615 B1 | * | 12/2003 | Hartmann .................. | 241/89.3 |

* cited by examiner

Primary Examiner—Drew Becker
(74) Attorney, Agent, or Firm—Arent Fox, LLP.

(57) ABSTRACT

A rotor for food pulping or straining machines is equipped with a plurality of blades (2) designed to act on the food product to force at least part of it out through a sieve (3) that surrounds the rotor (1) and is characterised in that the blades (2) are shaped in such a way as to cause sudden changes of direction in the moving product particles, thus producing a rapid succession of impulses that act on substantially stationary product particles adhering to the sieve (3), these impulses causing the propulsion of the substantially stationary product particles.

7 Claims, 1 Drawing Sheet

ROTOR BLADES FOR FOOD PROCESSING MACHINES

TECHNICAL FIELD AND BACKGROUND ART

The present invention relates to a rotor for pulping and straining machines for food products.

Machines for extracting juices and purées from plant or even animal products essentially consist of a filter or sieve, usually a perforated metal plate, which is cylindrical or conical in shape, and a rotary element (rotor) which turns within the sieve in such a way as to separate the particles that pass through the holes in the sieve from those that do not, the latter being discharged from the sieve as waste.

The rotor is a very important part of the system because the part of the product that has to be extracted usually adheres very strongly to the waste (for example, the flesh and peel of a fruit) and the main function of the rotor is to separate them.

The rotor usually comprises a central hub attached to a power driven shaft and is equipped with a certain number of blades that act on the product in the machine, causing it to rotate within the sieve.

Rotor components vary greatly in shape and size but all rotors known in prior art, whatever their shape, are designed to transmit to the product particles a combined circular and axial motion that causes them to follow a cylindrical or conical spiral path.

The useful part of the product is propelled through the holes in the sieve mainly by centrifugal force. All operating conditions being equal, a low viscosity product will be separated out more easily than one with a high viscosity.

Indeed, highly viscous products tend to form a layer that adheres to the walls of the sieve and makes it more difficult for the useful part of the product to pass through the holes.

This behaviour means that machines of this kind cannot be used on high-viscosity products (for example, banana purée) and, even in the case of medium-viscosity products, reduces machine efficiency.

DISCLOSURE OF INVENTION

The aim of the present invention is to overcome the above mentioned disadvantages and to provide a machine which, even for products that are difficult to process, allow the particles that adhere to the sieve to be detached and put back into circulation together with the other product particles moving within the machine.

These aims are fully accomplished by the rotor disclosed by the present invention, whose characteristic features are described in the claims below.

BEST MODE FOR CARRYING OUT THE INVENTION

The invention will now be described in more detail with reference to a preferred embodiment of it illustrated purely by way of example, without restricting the scope of the inventive concept, in the accompanying drawing, in which.

Figure 1:
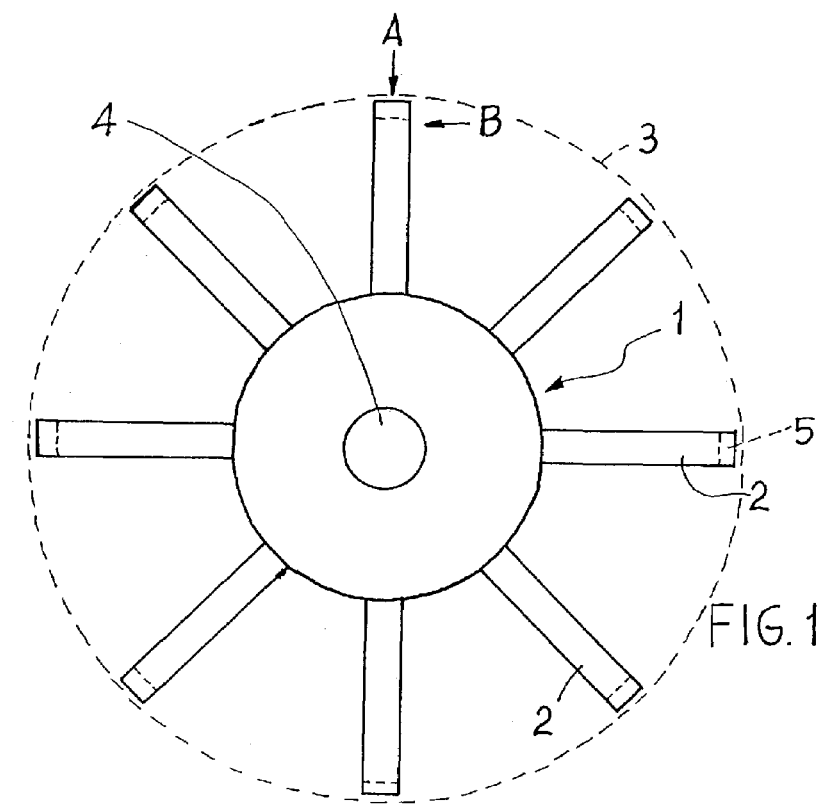
FIG. 1 is a schematic representation of the rotor, showing the sieve drawn with a dashed line.
Figure 2:
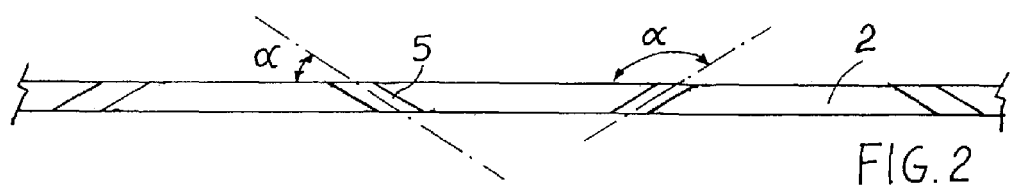
FIG. 2 illustrates a detail of a blade viewed in direction A.
Figure 3:
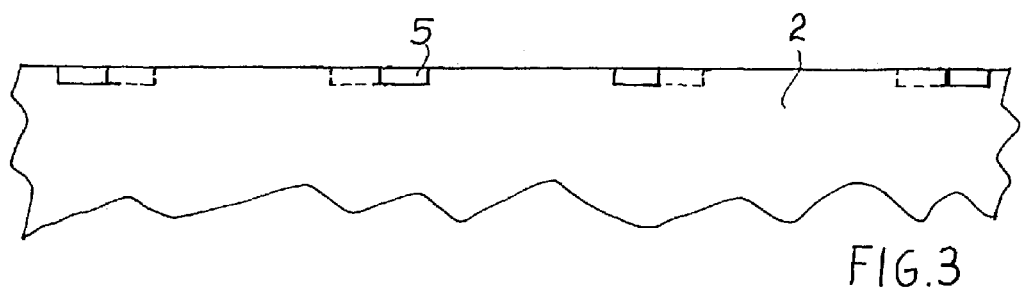
FIG. 3 illustrates a detail of a blade viewed in direction B.

With reference to the illustrations, the numeral 1 denotes in its entirety a rotor for a pulping or straining machine used to make food products and not illustrated since it is substantially of known type.

The rotor is equipped with a plurality of blades 2, eight in the embodiment illustrated, which, during the rotation of the rotor 1, are almost in contact with a cylindrical or conical sieve 3 that encloses the rotor and is drawn with a dashed line since it is of a substantially known type.

The rotor 1 has a central hub 4 attached to a power-driven shaft which is not illustrated since it is of customary type.

One or more of the blades 2 have one or more notches 5 made in the blade edge that faces the sieve 3.

The notches 5 on each blade may vary in number from one to ten in (but preferably from two to six) and they make an angle $\alpha$ with the surface of the blade, so that the motion transmitted to the moving product particles has an axial component whose direction is concordant with or opposite to the direction of the axial component of the spiral.

The angle $\alpha$ may vary between 10° and 80° or between 100° and 170°.

The width and depth of the notches normally range from one half to double the thickness of the blade.

Different rotor blades may have a different number of notches located at different positions. For example, one blade may have three notches in it and another, five notches. Further, the notches on one blade may be in the central zone of the blade, those on another, near the edges of the blade. Notch spacing may also vary.

Whatever their angle, size and location, the notches 5 are positioned in such a way as to produce sudden changes of direction in the moving product particles so that the path followed by the particles is not a spiral consisting of a continuous line but a broken spiral made up of a series of relatively short, angled lines.

These sudden changes of direction produce a rapid succession of impulses that act on the substantially stationary product particles adhering to the sieve with sufficient force to detach the particles from the sieve, and to put them back in circulation together with the other product particles moving within the machine.

In other words, the product particles that strike the angled surfaces of the notches undergo a sudden change of direction and transmit to the layer of particles adhering to the sieve an impulse that cancels their adhesive force and propels them into circulation again, thus neutralising the negative effects due to the viscosity of the product.

The number and distribution of the notches and the angle $\alpha$ are therefore a function of the physical properties of the product to be processed and, thanks to rotor rotation, may act on the entire surface of the sieve.

The amplitude of the angle $\alpha$ is such that the motion transmitted to the deflected product particles has an axial component, following the axis of the rotor, whose direction is concordant with or opposite to the direction of the axial component of the spiral.

When the direction is concordant, there is acceleration of the axial component. Motion in the opposite direction, on the other hand, causes deceleration.

By varying the combination of the two types of notches (those that produce acceleration and those that produce deceleration), it is possible to calculate and fix the average axial speed of the product and hence the duration of the process, which is particularly important in the case of highly viscous products which are difficult to process.

The moving product particles are subjected to sudden changes of direction, in such a way that they describe a broken spiral path consisting of relatively short, angled lines and producing a rapid succession of impulses that act on the substantially stationary product particles adhering to the sieve with sufficient force to detach them from the walls of the sieve and propelled into circulation together with the other moving product particles.

The invention claimed is:

1. A rotor for food pulping and straining machines comprising:
   a plurality of blades designed to act on a food product to force at least part of the food product out through a sieve that surrounds the rotor,
   wherein surface edges of the plurality of blades facing the sieve and defining an axial direction have at least one notch said notch having a longitudinal axis making an angle $\alpha$ with said axial direction of each of the plurality of blades the angle $\alpha$ varying between 10° and 80° or between 100° and 170° relative to the surface of the blade so as to cause sudden changes of direction in moving food product particles, thus producing a rapid succession of impulses that act on substantially stationary food product particles adhering to the sieve said impulses causing the substantially stationary food particles to be detached from the sieve.

2. A rotor according to claim 1, wherein the sudden changes of direction are such that the path followed by the moving food product particles is a broken spiral consisting of relatively short, angled lines.

3. A rotor according to claim 1, wherein the longitudinal axis of the notch makes an angle $\alpha$ with the surface each of the plurality of blades such that the motion transmitted to the moving food product particles has an axial component according to the rotor whose direction is concordant with the direction of the axial component of the spiral.

4. A rotor according to claim 1, wherein the longitudinal axis of the notch makes an angle $\alpha$ with the surface of the blade such that the motion transmitted to the moving food product particles has an axial component according to the rotor whose direction is opposite to the direction of the axial component of the spiral.

5. A rotor according to claim 1, wherein at least one of the plurality of blades has one to ten notches made therein.

6. A rotor according to claim 1, wherein the width and depth of the notch range from one half to double the thickness of each of the plurality of blades in which the notch is made.

7. A pulping or straining machine for food products, comprising at least one rotor whose blades are according to claims 1-2, 3-4 or 6.

* * * * *